US00RE44309E

(19) United States
(12) Reissued Patent
Kim

(10) Patent Number: US RE44,309 E
(45) Date of Reissued Patent: Jun. 25, 2013

(54) METHOD OF DISPLAYING DIRECTORY STRUCTURE OF RECORDED DATA

(75) Inventor: Hwan Kim, Seoul (KR)

(73) Assignee: LG Electronics Inc., Seoul (KR)

(21) Appl. No.: 12/901,348

(22) Filed: Oct. 8, 2010

Related U.S. Patent Documents

Reissue of:
(64) Patent No.: 7,468,481
Issued: Dec. 23, 2008
Appl. No.: 10/024,558
Filed: Dec. 21, 2001

(30) Foreign Application Priority Data

Dec. 21, 2000 (KR) ..... 10-2000-0079905

(51) Int. Cl.
*G10H 1/00* (2006.01)
*G10H 7/00* (2006.01)

(52) U.S. Cl.
USPC ..... 84/601; 84/615; 84/618; 84/477 R

(58) Field of Classification Search
USPC ..... 84/600–602, 609, 615, 618, 649, 84/653, 656, 477 R
See application file for complete search history.

(56) References Cited

U.S. PATENT DOCUMENTS

| | | | | |
|---|---|---|---|---|
| 5,500,929 | A * | 3/1996 | Dickinson | 715/853 |
| 6,005,679 | A | 12/1999 | Haneda | |
| 6,067,282 | A | 5/2000 | Moriyama et al. | |
| 6,247,012 | B1 * | 6/2001 | Kitamura et al. | 1/1 |
| 6,248,946 | B1 | 6/2001 | Dwek | |
| 6,396,849 | B1 | 5/2002 | Sarkissian et al. | |
| 6,448,985 | B1 * | 9/2002 | McNally | 715/784 |
| 6,735,623 | B1 | 5/2004 | Prust | |
| 6,810,441 | B1 | 10/2004 | Habuto et al. | |
| 6,922,707 | B2 | 7/2005 | Shimojima et al. | |
| 2002/0033844 | A1 | 3/2002 | Levy et al. | |
| 2002/0048105 | A1 | 4/2002 | Shin et al. | |
| 2002/0107973 | A1 | 8/2002 | Lennon et al. | |
| 2002/0116575 | A1 * | 8/2002 | Toyomura et al. | 711/115 |
| 2003/0233375 | A1 | 12/2003 | Sagar | |
| 2005/0015391 | A1 * | 1/2005 | Pohlan | 707/100 |
| 2008/0301590 | A1 * | 12/2008 | Ostergaard et al. | 715/853 |
| 2011/0184996 | A1 * | 7/2011 | Leventhal et al. | 707/822 |
| 2011/0213813 | A1 * | 9/2011 | Leventhal et al. | 707/825 |

FOREIGN PATENT DOCUMENTS

| | | | |
|---|---|---|---|
| JP | 09-050676 | | 2/1997 |
| JP | 09-050676 | A | 2/1997 |
| JP | 2000-076109 | | 3/2000 |
| JP | 2000-076109 | A | 3/2000 |
| KR | 2000-043865 | | 7/2000 |
| KR | 2000-43865 | * | 7/2000 |

* cited by examiner

*Primary Examiner* — Marlo Fletcher
(74) *Attorney, Agent, or Firm* — Birch, Stewart, Kolasch & Birch, LLP

(57) ABSTRACT

The present invention relates to a method of displaying directories differently based on attributes of files included therein. The present method examines a directory structure and the attributes of data files recorded on a recording medium, generates a mark for visually differentiating directories including at least one file of a pre-specified attribute, based on the examined attribute information, and displays a generated mark with the examined directory structure information. Owing to the present invention, a user can recognize directories including at least one file having a desired attribute at a glance, therefore, reproduction, selection, or copy for a file having a desirable attribute can be conducted very quickly.

16 Claims, 4 Drawing Sheets

METHOD OF DISPLAYING DIRECTORY STRUCTURE OF RECORDED DATA

Matter enclosed in heavy brackets [ ] appears in the original patent but forms no part of this reissue specification; matter printed in italics indicates the additions made by reissue.

*This application is a Reissue Application of U.S. Pat. No. 7,468,481B2 issued on Dec. 23, 2008, which claims foreign priority benefits of Korean Patent Application No. 10-2000-0079905 filed Dec. 21, 2000 in the Republic of Korea.*

BACKGROUND OF THE INVENTION

1. Field of the Invention

The present invention relates to a method of displaying directories differently in accordance with attributes of files included therein.

2. Description of the Related Art

In these days, a disk recording medium has a large storage capacity, so that a disk recording medium storing 'MP3' music files may include different attribute files, for example, text files in a hierarchical directory structure.

If a user wants to reproduce music files stored on such a disk recording medium, he or she must open many directories, one by one, and examine attributes of files under each directory. However, this task is very cumbersome. Moreover, it takes a relatively long time for 'MP3' music files written on a disk containing mixed-attribute files to be reproduced.

SUMMARY OF THE INVENTION

It is an object of the present invention to provide a method of providing information on whether a directory has a file with a certain attribute, in order to inform a user of directories having files having an attribute desired by a user.

A method of displaying a directory structure of a recording medium according to the present invention, examines the directory structure, and the attributes of data files recorded in the recording medium, generates a mark for visually differentiating between directories to show directories including at least one file of a pre-specified attribute, based on the examined attribute information, and displays the generated mark along with the examined directory's structure information.

Another method of displaying the directory structure of a recording medium according to the present invention examines directory structure and attributes of data files recorded in the recording medium, selects a file of a pre-specified attribute based on the examined attribute information, and displays a hierarchical directory structure for the selected file.

BRIEF DESCRIPTION OF THE DRAWINGS

The accompanying drawings, which are included to provide a further understanding of the invention, illustrate the preferred embodiments of the invention, and together with the description, serve to explain the principles of the present invention.

In the drawings.

FIG. 1 is a block diagram of an optical disk device, which a directory displaying method according to the present invention is applicable to;

DETAILED DESCRIPTION OF THE PREFFERRED EMBODIMENT

In order that the invention may be fully understood, a preferred embodiment thereof will now be described with reference to the accompanying drawings.

Figure 1:
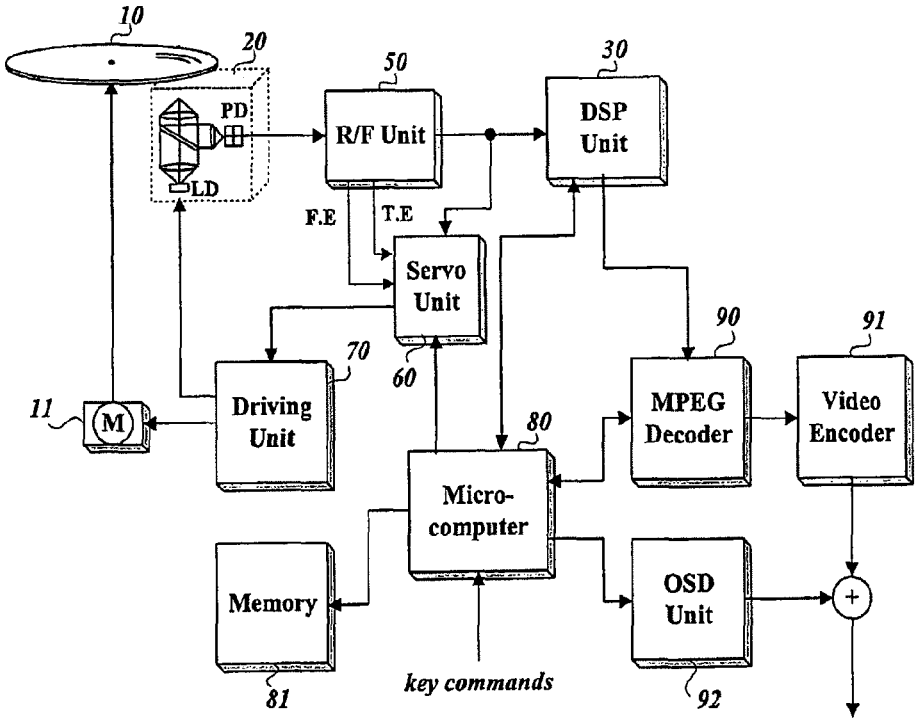

Shown in FIG. 1 is an optical disk device, which a directory displaying method according to the present invention is applied to, comprising an optical pickup 20 for detecting recorded signals from an optical disk 10, such as a digital versatile disk (DVD), an R/F unit 50 for outputting binary signals and TE (Tracking Error) and FE (Focussing Error) signals through combining signals detected from the disk 10 by the optical pickup 20, a driving unit 70 for driving the spindle motor 11 for rotating the disk 10, a servo unit 60 for providing control input to the driving 70 based on the TE and FE signal and rotation speed of the disk 10, a digital signal processing (DSP) unit 30 for restoring audio or compressed moving-picture digital data from the binary signals by processing them with an internal clock phase-locked with them, an MPEG decoder 90 for decoding the audio or compressed moving-picture digital data into a video and/or audio signal, a video encoder 91 for converting the video signal from the MPEG decoder 90 to a television signal, an OSD (On Screen Display) unit 92 for displaying characters or text on a screen, a microcomputer 80 for supervising overall operations of all elements, especially, examining attributes of files written in the disk 10 and their directory structure, and controlling display of information obtained from the examination, and a memory 81 for storing temporary data.

Figure 2:
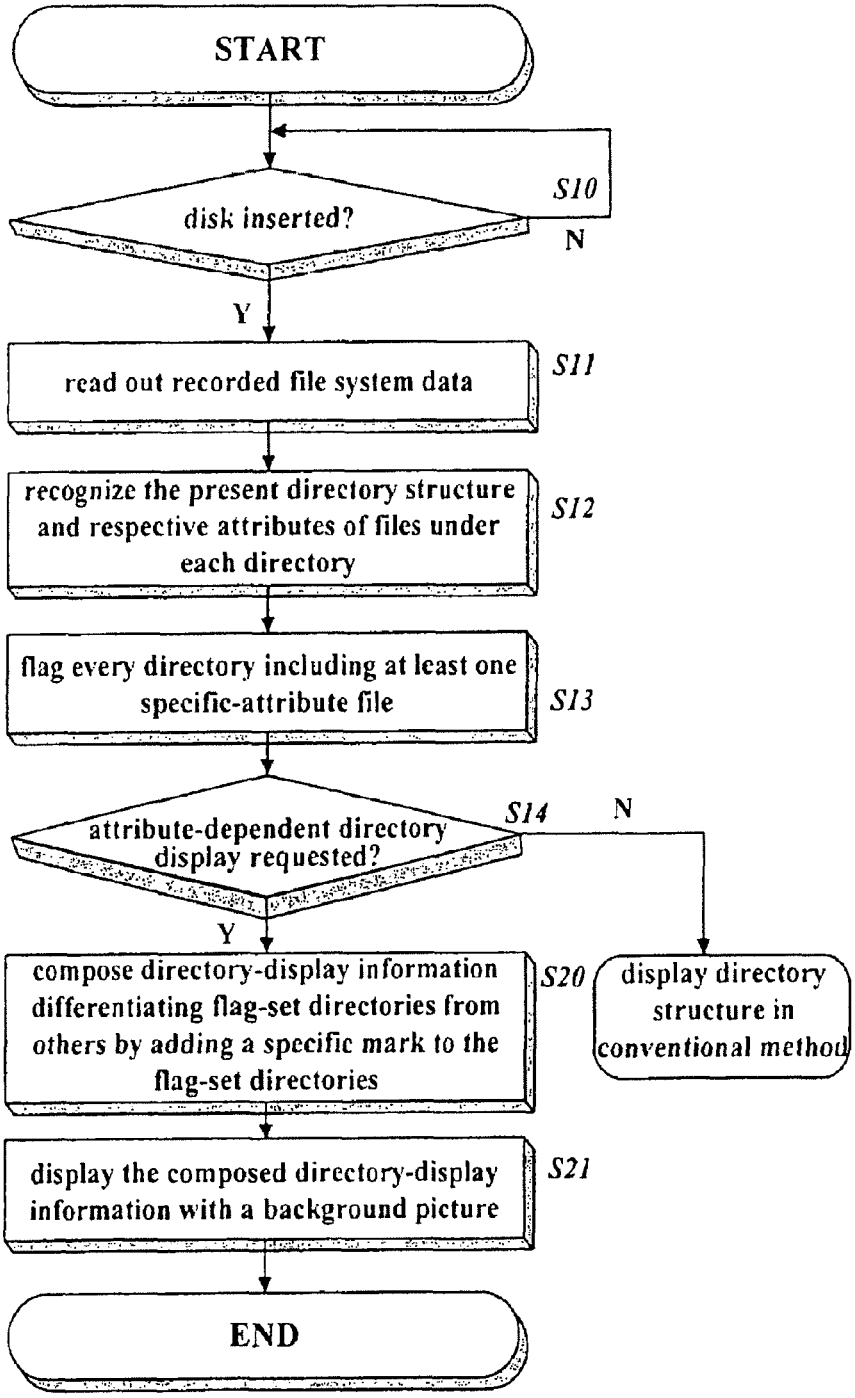
FIG. 2 is a flow chart of a directory displaying method embodying the present invention illustratively.

FIG. 2 is a flow chart of a directory displaying method embodying the present invention illustratively. The method of FIG. 2 employed by the disk device configured as FIG. 1 is described below in detail.

Figure 3:
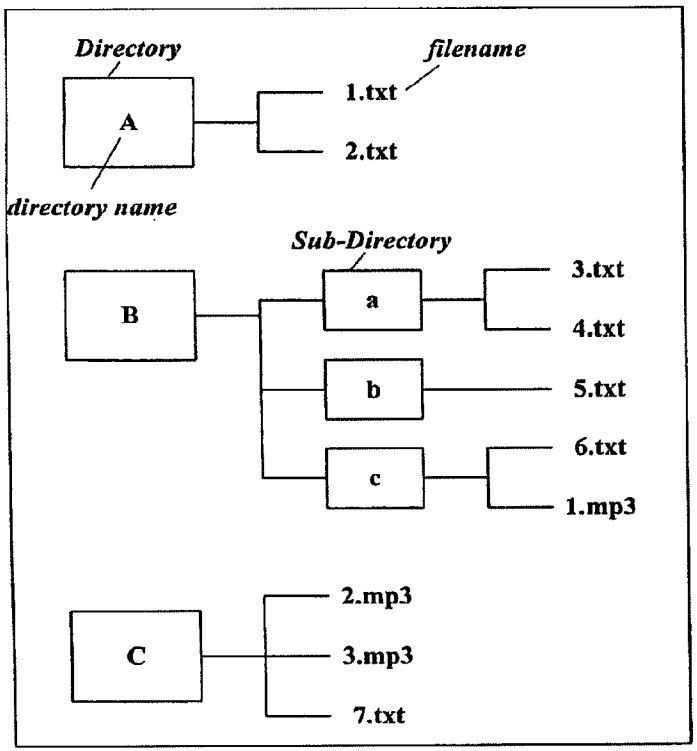
FIG. 3 is an example of directories created on a disk, and files under each directory.

For the sake of convenient explanation, it is assumed that the disk 10 loaded into the disk device of FIG. 1 has non-MP3 files, for example, text files as well as MP3 files with the hierarchical directory structure given in FIG. 3.

If a user inserts the disk 10 into the disk device (S10), the microcomputer 80 rotates the disk 10 by controlling the servo unit 60 and the driving unit 70 and moves the pickup 20 to the file system area of the disk 10 at the same time. Then, the pickup 20 reads out recorded signals constituting file system data (S11) and the read signals are restored into data through the processes of the R/F unit 50 and the DSP unit 30. The restored file system data is stored in the memory 81.

The microcomputer 80 examines the file system data stored in the memory 81, and recognizes the file structure given in FIG. 3, and respective attributes of files under each directory (S12). File attributes can be identified from file extensions such as '.txt' and '.MP3'.

After the examination of the directory structure and the attributes of files included in each directory, every directory including at least one specific-attribute file, for example, 'MP3' file is flagged by the microcomputer 80 (S13).

If the disk device has a disk-writing mechanism, and the inserted disk 10 is writable, all information obtained from the examination can be stored in the disk 10 as a file of pre-specified name, or in a user-information area located between lead-in area and program area of the disk 10.

Figure 4:
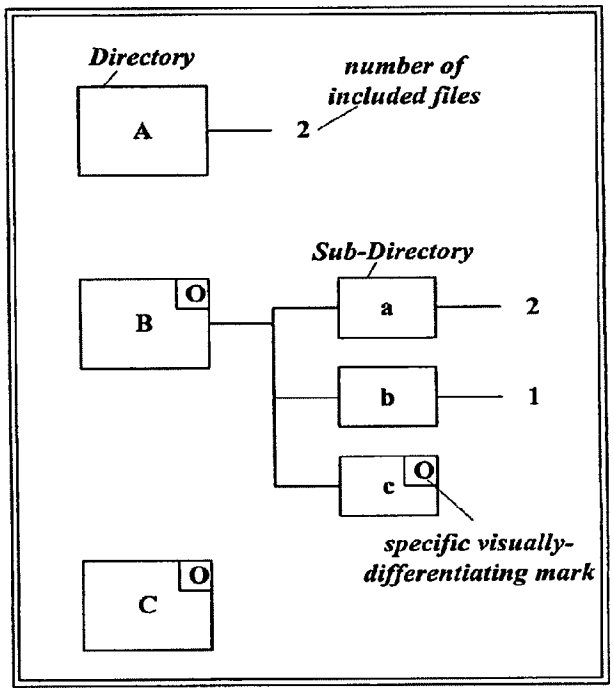
FIGS. 4 to 6 illustrate directory display formats according to the present invention.

On the condition that information on directory structure and files of the inserted disk 10 has been obtained, if a user requests that directories are displayed differently in accordance with attributes of files included therein (S14), the microcomputer 80 provides directory information for the user based on the stored information in the memory 81. To do this, the microcomputer 80 composes directory-display information which differentiates flag-set directories and their parent directories, if any, from other directories by adding a specific mark such as 'O' to the flag-set directories and their parent directories (as shown in FIG. 4), and it appends the number of files under the other directories, whose flag is not set, to their directory names (S20). The microcomputer 80 also computes x-y coordinate values of each directory, based on the examined directory's structure, taking into consideration that the examined directory structure will be displayed on a screen, and stores the x-y coordinate values in connection with the directory-display information.

The directory-display information is organized such that it is to be displayed horizontally from the upper directory, lower directory, and file names as shown in FIG. 4. Such-constructed directory-display information is converted into corresponding OSD characters by the OSD unit 92, and is mixed with a background picture, which is provided from a memory or a disk, outputted by the video encoder 91. The mixed video signal is presented to an external displaying apparatus such as a television set (S21).

Therefore, a user can recognize with ease, directories including at least one 'MP3' file, and the number of other attribute files under directories, not including any 'MP3' file from the directory screen displayed as given in FIG. 4, without opening and checking all directories individually.

In the meantime, while a user moves a screen pointer on the directory-displayed screen with a remote controller, the microcomputer 80 continues to track the moving pointer and continues computing the x-y coordinate value of the pointer. If a user presses an 'enter' key on a certain directory which he or she wants detailed information about, the microcomputer 80 identifies a selected directory by comparing the stored coordinate value of each directory with the coordinate value of the pointer at the time the 'enter' key is pressed, and it assembles additional information such as filename, about files under the identified directory, and displays the additional information onto the displaying apparatus through the OSD unit 92.

Because the identified directory may include non-MP3 files, the microcomputer 80 may assemble the additional information such that the aforementioned specific mark is appended to filenames of 'MP3' files.

Figure 5:
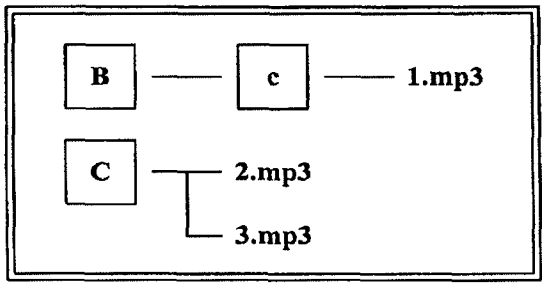

In addition, the microcomputer 80 can provide the directory information stored in the memory 81 in different formats. For example, only flag-set directories, which include at least one 'MP3' file, among all directories of the disk 10 may be displayed with filenames of 'MP3' files under each flag-set directory as shown in FIG. 5. Therefore, a user can easily identify detailed 'MP3' files including directories.

Figure 6:
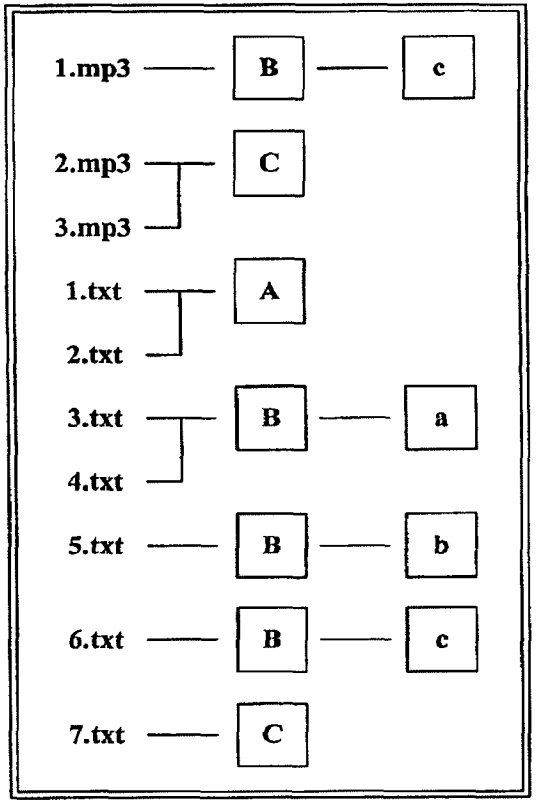

The microcomputer 80 can also provide the directory information stored in the memory 81 in the reverse displaying format of FIG. 4, namely, from each filename, lower directory, and upper directory as shown in FIG. 6. To do this, the microcomputer 80 analyzes the file system data stored in the memory 81 first, then it classifies the files according to their attributes and provides each classified file with its bottom-up directories. Therefore, a user can recognize file types, and each directory scheme for each file at a glance.

In the display format of FIG. 6, files of a pre-specified attribute, namely, 'MP3' music files, are displayed before other attribute files on a screen, or a screen area may be divided for each file attribute so that files having the same attribute are listed in the same divided window. Instead of displaying bottom-up directories for a certain file, only the uppermost directory may be displayed in connection with each file.

In this file display format, instead of the bottom-up display scheme shown in FIG. 6, a top-down display scheme may be used for each file, namely, a file and its directory path may be displayed from its uppermost directory, lower directory, next lower directory, . . . , and that file.

Based on the above, all directories are displayed according to whether each directory has an 'MP3' file (as shown in FIG. 4) when a user requests a distinguishable directory display. However, directory information for only the directory which a user selects may be provided. For example, if a directory selected through an input device such as a remote controller has at least one 'MP3' file, that is, the selected directory is flagged in the process of the file system examination, a specific mark is added to the name of that directory to notify a user that at least one 'MP3' file is included therein.

If the selected directory includes no 'MP3' file, namely, if the selected directory is unflagged, the number of files under that directory is displayed instead of the specific mark in order to notify a user of how many non-MP3 files the selected directory includes.

In the embodiments explained above, directories including at least one file of pre-specified attribute are displayed differently from those including files having other attributes. However, it is also possible to display vice versa, namely, directories not including any file of pre-specified attribute can be displayed differently from those including at least one file having that attribute. When this occurs, a mark for visually differentiating a directory, for example, a mark 'X' is preferable to designate no inclusion.

The method of displaying a directory structure according to the present invention enables a user to recognize directories including at least one file having a desired attribute at a glance. Owing to the present invention, reproduction, selection, or copy for a file having a desirable attribute can be conducted very quickly.

The invention may be embodied in other specific forms without departing from the sprit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A computerized method of displaying the structure of a directory of file data stored in a recording medium that contains a plurality of directories, wherein any directory is capable of containing files having different attributes, comprising the steps of:

pre-specifying an attribute of a file;

using a computer to examine the structure of the file data, including file attributes, to determine whether or not a directory that is capable of containing files having different attributes includes at least one file having the pre-specified attribute on the recording medium;

using a computer to generate a mark for indicating the result of the examining step; and displaying the generated mark on the directory as an indication of whether the directory that is capable of containing files having different attributes does or does not include at least one file having the pre-specified attribute.

2. The method set forth in claim 1, wherein the file of said pre-specified attribute is related to audio or video contents.

3. The method set forth in claim 1, wherein said displaying step further displays an uppermost directory of the said directory.

4. The method set forth in claim 1, wherein said mark is displayed on the directory, that does include at least one file of said pre-specified attribute.

5. The method set forth in claim 1, wherein said mark is displayed on the directory that does not include at least one file of said pre-specified attribute.

6. The method set forth in claim 1, wherein said mark further shows the number of files included in a directory.

7. A computerized system to display the structure of a directory of file data stored in a recording medium that contains a plurality of directories, wherein any directory is capable of containing files having different attributes, comprising:

means for pre-specifying a file attribute;

computerized means for examining the structure of the file data, including file attributes, to determine whether or not a directory that is capable of containing files having different attributes includes at least one file having a the pre-specified attribute on the recording medium;

computerized means for generating a mark for indicating the result of the examining step; and computerized means for displaying the generated mark on the directory as an indication that the directory that is capable of containing files having different attributes includes at least one file having the pre-specified attribute.

8. The system set forth in claim 7, wherein the file of said pre-specified attribute is related to audio or video contents.

9. The system set forth in claim 7, wherein said means for displaying further displays an uppermost directory of the said directory.

10. The system set forth in claim 7, wherein said mark is displayed on the directory, including at least one file of said pre-specified attribute.

11. The system set forth in claim 7, wherein said mark is displayed on the directory not including any file of said pre-specified attribute.

12. The system set forth in claim 7, wherein said mark further shows the number of files included in a directory.

13. A computerized method of displaying directories of files contained on a recording medium that contains a plurality of directories, wherein any directory is capable of containing flies having different attributes including at least one 'MP3' file, and the number of files having attributes other than an "MP3" attribute, and excluding any file that does not have an "MP3" attribute from the displayed directory without requiring a user of a device or system using the memory to open and check all directories individually to obtain file attribute information, comprising:

a1) pre-specifying at least one file attribute a2) computerized reading of recorded file system data;

b) computerized recognizing of the directory structure and respective attributes of files on the recording medium;

c) computerized flagging of every directory on the recording medium that contains a plurality of directories, wherein any directory is capable of containing files having different attributes including the at least one pre-specified file attribute;

d) computerized composing of directory-display information that differentiates flag-set directories from other directories by adding a specific mark to the flag-set directory display; and e) computerized displaying of composed directory-display information.

14. A computerized system for displaying directories of files contained on a recording medium that contains a plurality of directories, wherein any directory is capable of containing files having different attributes including at least one 'MP3' file, and the number of files having attributes other than an "MP3" attribute, and excluding any file that does not have an "MP3" attribute from the displayed directory without requiring a user of a device or system using the memory to open and check all directories individually to obtain file attribute information, comprising:

f) computerized means for reading recorded file system data;

g) computerized means for recognizing the directory structure and respective attributes of files on the recording medium;

h) means for pre-specifying at least one specific file attribute and computerized means for flagging every directory on the recording medium that contains a plurality of directories, wherein any directory is capable of containing tiles having different attributes including said at least one pro-specified file attribute;

i) computerized means for composing directory-display information that differentiates flag-set directories from other directories by adding a specific mark to the flag-set directory display; and j) computerized means for displaying composed directory-display information.

*15. A computerized method for displaying directories of files contained on a recording medium that contains a plurality of directories, wherein any directory is capable of containing files having different attributes including at least one specific file, and the number of files having attributes other than an attribute of the at least one specific file, and identifying any directory having a file that does not have the attribute of the at least one specific file from the displayed directories without having to open and check all the directories individually to obtain file attribute information, the computerized method comprising:*

*pre-specifying at least one file attribute;*

*computerized reading of recorded file system data;*

*computerized recognizing of a directory structure and respective attributes of files on the recording medium;*

*computerized flag-setting of at least one directory on the recording medium that contains a plurality of directories, wherein the at least one directory is capable of containing files having different attributes including the at least one pre-specified file attribute, and wherein the at least one flag-set directory contains at least one file having attributes including the at least one pre-specified file attribute;*

*computerized composing of directory-display information that differentiates the at least one flag-set directory from other directories by visually differentiating the at least one flag-set directory from the other directories; and*

*computerized displaying of the composed directory-display information.*

*16. A computerized system for displaying directories of files contained on a recording medium that contains a plurality of directories, wherein any directory is capable of containing files having different attributes including at least one specific file, and the number of files have attributes other than an attribute of the at least one specific file, and for identifying any directory having a file that does not have the attribute of the at least one specific file from the displayed directories*

*without having to open and check all the directories individually to obtain file attribute information, the computerized system comprising:*

*computerized means for reading recorded file system data;*

*computerized means for recognizing a directory structure and respective attributes of files on the recording medium;*

*means for pre-specifying at least one specific file attribute and computerized means for flag-setting at least one directory on the recording medium that contains a plurality of directories, wherein the at least one directory is capable of containing files having different attributes including the at least one pre-specified file attribute, and wherein the at least one flag-set directory contains at least one file having attributes including the at least one pre-specifies file attribute;*

*computerized means for composing directory-display information that differentiates the at least one flag-set directory from other directories by visually differentiating the at least one flag-set directory from the other directories; and*

*computerized means for displaying the composed directory-display information.*

* * * * *